United States Patent [19]

Machida et al.

[11] E Patent Number: Re. 32,194

[45] Reissued Date of Patent: Jun. 24, 1986

[54] MEANS FOR COMPATIBLY REPRODUCING VIDEO DISCS RECORDED ACCORDING TO DIFFERENT BROADCAST STANDARDS

[75] Inventors: Toyotaka Machida; Hitoshi Aoike; Toshimasa Kumazaki; Yasuaki Watanabe; Yuichi Ikemura, all of Yokohama, Japan

[73] Assignee: Victor Company of Japan, Ltd., Yokohama, Japan

[21] Appl. No.: 691,267

[22] Filed: Jan. 14, 1985

Related U.S. Patent Documents

Reissue of:

[64] Patent No.: 4,445,143
Issued: Apr. 24, 1984
Appl. No.: 260,589
Filed: May 6, 1981

[51] Int. Cl.[4] ..... H04N 9/491; H04N 9/44

[52] U.S. Cl. ..... 358/322; 358/372; 358/330

[58] Field of Search ..... 358/310, 320, 322, 355, 358/357, 342, 11; 360/9.1; 369/47, 50

[56] References Cited

U.S. PATENT DOCUMENTS

| | | | |
|---|---|---|---|
| 3,389,231 | 6/1968 | Brundage | 369/47 |
| 3,580,990 | 5/1971 | Numakura | 358/330 |
| 3,917,415 | 11/1975 | Eguchi | 358/11 X |
| 3,934,262 | 1/1976 | Snopko | 358/322 |
| 4,123,779 | 10/1978 | Goldschmidt | 358/338 |
| 4,148,077 | 4/1979 | Bragas | 360/9.1 |
| 4,223,349 | 9/1980 | Dakin et al. | 358/342 X |
| 4,282,545 | 8/1981 | Bragas | 358/322 X |
| 4,313,191 | 1/1982 | Winslow et al. | 369/50 |
| 4,315,283 | 2/1982 | Kinjo et al. | 358/342 |
| 4,338,683 | 7/1982 | Furukawa et al. | 369/50 |

FOREIGN PATENT DOCUMENTS

| | | | |
|---|---|---|---|
| 2365612 | 10/1975 | Fed. Rep. of Germany | 358/342 |
| 2638359 | 2/1978 | Fed. Rep. of Germany | 358/342 |

*Primary Examiner*—Aristotelis M. Psitos
*Attorney, Agent, or Firm*—Louis Bernat

[57] ABSTRACT

A rotary recording medium reproducing apparatus reproduces a recorded signal from a rotary recording medium by use of a reproducing element. The rotary recording medium is recorded with at least a first carrier signal which is modulated by an information signal having a synchronizing signal of a predetermined frequency. The reproducing apparatus comprises a motor for rotating the rotary recording medium, a reference signal generating circuit for generating a reference signal having a frequency equal to a horizontal scanning frequency of a video signal of a standard television system which is characteristic of the reproducig apparatus and should originally be reproduced, or equal to 1/M (M is an integer) times the above horizontal scanning frequency, a detecting circuit for detecting a signal respective of the rotational speed of the rotary recording medium, and a comparator for comparing the reference signal and the signal respective of the rotational speed of the rotary recording medium, to control the rotational speed of the rotary recording medium by a compared output signal thus obtained, so that the synchronizing signal within the reproduced signal is reproduced at a frequency equal to the horizontal scanning frequency of the above standard television system with which the reproduction should originally be performed.

8 Claims, 6 Drawing Figures

MEANS FOR COMPATIBLY REPRODUCING VIDEO DISCS RECORDED ACCORDING TO DIFFERENT BROADCAST STANDARDS

Matter enclosed in heavy brackets [ ] appears in the original patent but forms no part of this reissue specification; matter printed in italics indicates the additions made by reissue.

BACKGROUND OF THE INVENTION

The present invention relates generally to apparatuses for reproducing a video signal of a certain system recorded on a rotary recording medium as a video signal of a different system. More specifically, the invention relates to an apparatus for reproducing a video signal recorded on a rotary recording medium as a video signal of one out of a plurality of different systems which are classified according to difference in the field frequency and the number of horizontal scanning lines as a video signal substantially of another system.

At present, there are two principal video signal systems for television. One system, used in the United States, Japan, and other countries (hereinafter referred to as the "first standard system" or the "first system") is based on a field frequency of 60 Hz (precisely speaking, 59.94 Hz in the case of a color video signal) with a number of horizontal scanning lines of 262.5 lines within one field. The other system, used in Europe and other areas (hereinafter referred to as the "second standard system" or the "second system") is based on a field frequency of 50 Hz with 312.5 horizontal scanning lines within one field. There are various other systems such as those of combinations of field frequencies and numbers of horizontal scanning lines within one field of 50 Hz and 202.5 lines and 50 Hz and 409.5 lines. However, with the full-scale spread of color broadcasting, the trend of intensification is toward the above mentioned first and second standard systems.

As is known, video signal systems can be further classified by the mode of transmission of the chrominance signal as the NTSC system, the PAL system, and the SECAM system in addition to the above described classification based on differences in field frequency and number of horizontal scanning lines within one field. With respect to this difference in mode of transmission of the chrominance signal, mutual conversion can be carried out with relative ease by an electrical process.

However, so-called system conversion, wherein field frequency and number of horizontal scanning lines within one field are converted, has heretofore required very complicated and elaborate apparatus. More specifically, the necessity for so-called system conversion, wherein field frequency and number of horizontal scanning lines are converted, has heretofore been primarily a problem mutually between broadcasting stations or networks as in international relay broadcasting between different regions (for example, between Europe and the United States). For this reason, it has been necessary to carry out this system conversion in a manner to meet very strict standards. Consequently, elaborate and large-scale electronic conversion apparatuses have been employed.

In an advanced electronic conversion apparatus being used at present, a system by which a video signal is once converted into a digital signal, which is then stored in a digital memory of large capacity, subsequently read out in a required sequence, and restored into the original video signal is used. By manipulating the time ratio of this signal storing and reading out, conversion of field frequency and number of horizontal scanning lines is accomplished. This electronic conversion apparatus, however, is disadvantageously elaborate and expensive.

On the other hand, a reproducing apparatus has been reduced to practice, which is adapted to reproduce a video signal recorded on a rotary recording medium (so-called video disc, and hereinafter simply referred to as a "disc") in a reproducing system such as an electrostatic or an optical reproducing system. The disc reproducing apparatus only reproduces a standard video signal which is recorded on the disc. Accordingly, it is not necessary for the modulation format of a chrominance signal to conform to the NTSC system, the PAL system, or the SECAM system. It is sufficient to convert the chrominance signal into a predetermined modulation format which conforms to a television system of a television receiver, when the disc reproducing apparatus produces and supplies the standard color video signal to the above television receiver. Hence, by incorporating a conversion device for obtaining a specific carrier chrominance signal of the NTSC system, the PAL system, or the SECAM system, in the disc reproducing apparatus, the disc reproducing apparatus can be made compatible with respect to another reproducing apparatus having a different chrominance signal transmission format.

Therefore, compatibility of the disc reproducing apparatus can be obtained by considering the difference in the chrominance signal transmission format described above. Since the difference between the horizontal scanning frequencies in differing television systems is 0.7% which indicates that the horizontal scanning frequencies are approximately equal, the horizontal scanning frequency within the disc reproducing signal can be reproduced at an original horizontal scanning frequency by the disc reproducing apparatus, by controlling the rotational speed of the disc. Thus, the rotational speed of the disc was conventionally controlled by performing a servo operation so that the frequencies of the reference signal in a turntable servo circuit and the reproduced horizontal synchronizing signal, respectively coincide. However, in this conventional apparatus, a predetermined servo operation could not be performed when the rotational speed of the disc was not close to the regular rotational speed.

SUMMARY OF THE INVENTION

Accordingly, a general object of the present invention is to provide a novel and useful disc reproducing apparatus in which the above described problems have been overcome.

Another and more specific object of the present invention is to provide a disc reproducing apparatus capable of reproducing a disc in which a video signal of a television system other than a television system of a video signal which is to be originally reproduced by the disc reproducing apparatus, by performing a predetermined servo operation even when the rotational speed of the disc is not close to the regular rotational speed of the disc. According to the disc reproducing apparatus of the present invention, reproduction can be performed without modifying the present television receiver, and maintaining compatibility with other reproducing apparatuses in a state where no inconveniences are introduced with respect to practical use.

Still another object of the present invention is to provide a disc reproducing apparatus in which the rotational speed of a rotary shaft of a motor for rotating a disc of an constant-angular velocity system is detected, and the rotational speed of the disc is controlled by a signal obtained by comparing the above detected rotational speed and a reference signal, to always reproduce the reproducing horizontal scanning frequency at a predetermined frequency.

Another object of the present invention is to provide a disc reproducing apparatus capable of reproducing a color video signal upon any interchanged-reproduction of a disc recorded with a color video signal of any horizontal scanning frequency, by commonly using a color signal processing circuit, 1H delay line for separating the luminance signal and the carrier chrominance signal, and the like within the reproducing apparatus, and controlling the rotational speed of the disc so that the reproducing horizontal scanning frequency is always reproduced at a predetermined frequency, where the disc is recorded with a carrier signal which is modulated by a signal obtained by multiplexing a luminance signal and a carrier chrominance signal having a color sub-carrier frequency which is $(2n-1/2)$(n is an integer which is identical within each television system) times the horizontal scanning frequency.

Still another object of the present invention is to provide a disc reproducing apparatus capable of reproducing an audio disc in which an audio signal is pulse-code-modulated and recorded, by adding a simple adapter to an apparatus which originally reproduces a disc recorded with a video signal.

Other objects and further features of the present invention will be apparent from the following detailed description when read in conjunction with the accompanying drawings.

DETAILED DESCRIPTION

Figure 1:
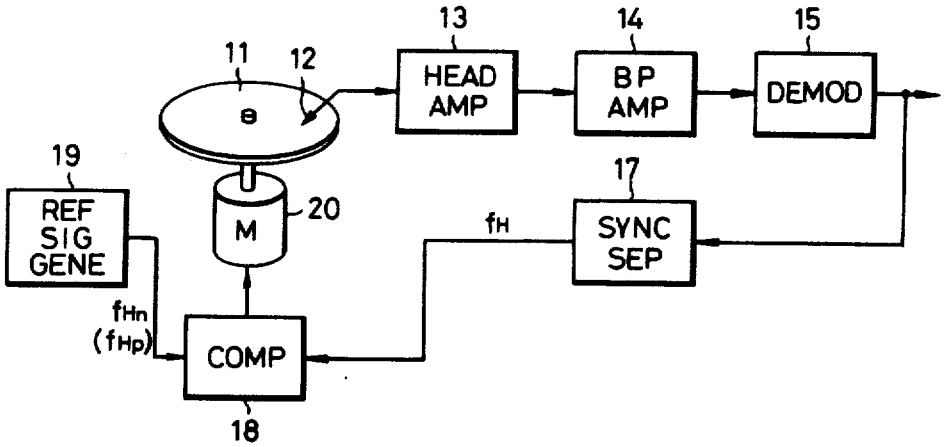
FIG. 1 PRIOR ART
FIG. 1 is a systematic block diagram showing one example of a conventional reproducing apparatus.

In order to readily understand the present invention, the NTSC system color television system (hereinafter referred to as the N system, and represented by a subscript n) based on a field frequency of 59.94 Hz (approximately 60 Hz) with 525 horizontal scanning lines within one frame, and the PAL system color television system and the SECAM system color television system (hereinafter refereed to as the P system, and represented by a subscript p) based on a field frequency of 50 Hz with 625 horizontal scanning lines within one frame, are given as examples, and will be first described. The disc and the reproducing apparatus are respectively distinguished depending on the color television systems. A disc on which the N system color video signal has been recorded is designated by Dn, and another disc on which the P system color video signal has been recorded is designated by Dp. As described above, the carrier chrominance signal of the color video signal is not required to be recorded in the N or P system. Further, a reproducing apparatus adapted for reproducing the video disc Dn to produce the N system color video signal, is designated by Rn, and another reproducing apparatus adapted for reproducing the video disc Dp to produce the P system color video signal, is designated by Rp.

In the N system color video signal, 1H (H represents one horizontal scanning period) is 63.5 $\mu$s, which has a difference of only 0.7%, when compared with 64 $\mu$s which is 1H of the P system color video signal. This means that, when the reproducing apparatus Rn is used to reproduce the video disc Dp, the apparatus Rn rotates the video disc Dp at a speed which is 0.7% higher than a specific speed, to reproduce the color video signal so that the horizontal scanning frequency reproduced from the disc Dp corresponds to that of the N system. This speed-up rotation of the video disc only results in the reproduction of the video disc Dp having a one-hour program, by about 25 seconds earlier than the normal reproducing time. On one hand, if the reproduced horizontal scanning frequency $f_H$ is of the N system, the electric circuit of the reproducing apparatus Rn operates normally irrespective of the program content of the disc Dp, and no inconveniences are introduced.

In the video signal thus reproduced, the number of scanning lines per frame is 625 which corresponds to that of the P system color video signal recorded on the disc Dp, and the field frequency becomes 0.7% higher than 50 Hz. Assuming that a commercially available N system color television receiver is used as monitor for receiving and indicating the above video signal, this television receiver is generally set to a standard frequency of 60 Hz, however, the receiver can generally be adjusted to a standard frequency of 50 Hz by a control knob provided on a front panel of the receiver. The television receiver thus adjusted receives the video signal from the reproducing apparatus Rn and reproduces a picture which is somewhat expanded vertically, but is in synchronism with respect to both the horizontal and vertical directions. Accordingly, by controlling the rotational speed of the video disc Dp, the combination of the N system reproducing apparatus Rn and the N system color television receiver is capable of performing reproduction which is not perfect but sufficiently practical for application.

Similarly, by rotating the video disc Dn at a speed which is slower than a specific speed by 0.7% to reproduce the color video signal having the P system horizontal scanning frequency, the time required to reproduce the program of the video disc takes about 25 seconds longer per one-hour program, and the reproduced picture is somewhat compressed vertically compared to the normal picture. However, the combination of the reproducing apparatus Pp and the P system color television receiver is capable of reproducing a picture which is sufficiently clear in practical applications.

Hence, there was a conventional apparatus as indicated in FIG. 1, which is adapted to control the rotation of the disc Dp (or Dn) so as to reproduce the recorded horizontal synchronizing signal at a specific horizontal scanning frequency $f_{Hn}$ (or $f_{Hp}$) determined by the reproducing apparatus Rn (or Rp). In FIG. 1, a color video signal picked up and reproduced by a reproducing element 12 from a disc 11, is supplied through a head amplifier 13 to a band-pass amplifier 14, wherein a predetermined frequency component of the signal is filtered and amplified. The signal thus amplified, is then demodulated by a demodulation circuit 15, and thereafter, led out through an output terminal 16 on one hand, and supplied to a synchronizing signal separation circuit 17 on the other. A horizontal synchronizing signal obtained from the separation circuit 17 is supplied to a comparator 18 wherein the signal is subjected to phase comparison with a reference signal supplied from a reference signal generator 19. The reference signal has a frequency equal to the specific horizontal scanning frequency $f_{Hn}$ (or $f_{Hp}$) determined by the reproducing apparatus Rn (or Rp). The comparator 18 thus generates an error signal respective of the phase difference.

The output error signal from the comparator 18 is applied to a motor 20 for rotating a turntable. Therefore, the rotational speed of the disc 11 is controlled so that the frequency $f_H$ of the reproduced horizontal synchronizing signal coincides with the frequency $f_{Hn}$ (or $f_{Hp}$) of the reference signal.

Here, the color video signal recorded on the disc is a carrier signal wherein the carrier signal is frequency modulated, phase modulated, or amplitude modulated. Thus, in order to perform separation and filtering operation at the band-pass amplifier 14, the disc 11 must rotate at a speed near the normal rotational speed. Accordingly, the above described apparatus wherein a servo control is not performed until the rotating speed of the disc approaches near the normal rotating speed, can hardly be reduced into practice.

Figure 2:
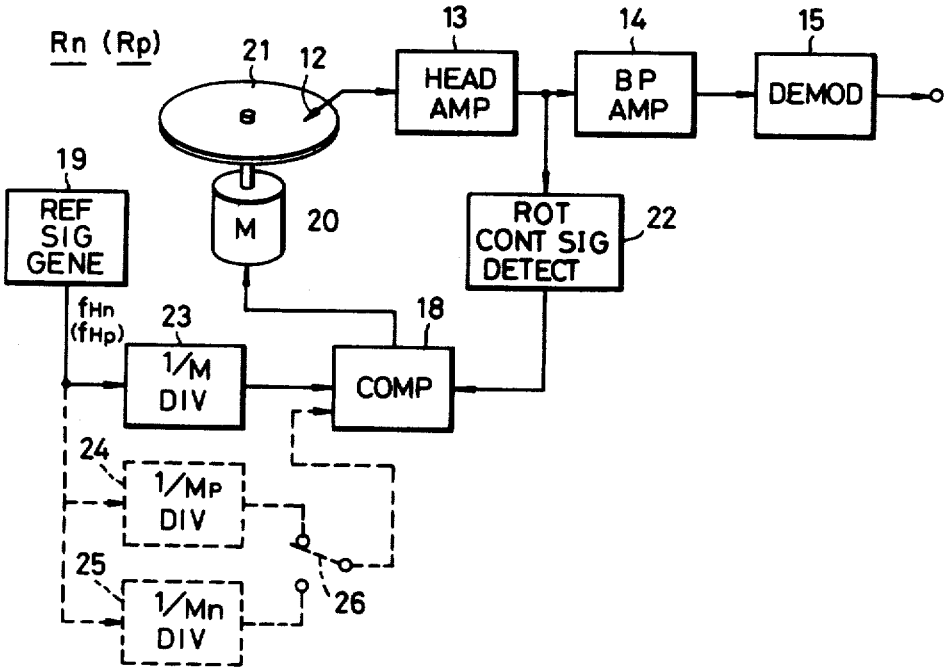
FIG. 2 is a systematic block diagram showing a first embodiment of a reproducing apparatus of the present invention.

FIG. 2 is a systematic block diagram showing a first embodiment of an apparatus according to the present invention. In FIG. 2, those parts which are the same as those corresponding parts in FIG. 1 are designated by like reference numerals, and their description is omitted. A disc 21 of the N system (or the P system) is recorded with a frequency divided multiplexed signal formed from a chrominance signal modulated by the color video signal, and a chrominance signal modulated by a frequency which is 1/M (M is an integer) times the horizontal scanning frequency $f_{Hn}$ (or $f_{Hp}$). A rotational speed control signal detection circuit 22 is disposed in a signal path different from a color video signal demodulation signal path, and operates to detect a rotational speed detection signal from the reproduced signal. The rotational speed control signal is a carrier signal modulated by a frequency which is 1/M times the horizontal scanning frequency $f_{Hn}$ (or $f_{Hp}$) and has tone burst waveform. The detection circuit 22 is adapted to detect the envelope of the rotational speed control signal, which means that the rotational speed control signal can be detected over a wider range of rotrtional speeds of the P system (or N system) disc 21, that is, the rotational speed control signal can be detected before the rotational speed of the disc approaches near the specific rotational speed.

The reference signal supplied from the reference signal generator 19 is subjected to a 1/M frequency division by a 1/M frequency divider 23, and is then supplied to the comparator 18, wherein the frequency divided signal is phase compared with the rotational speed control signal detected by the rotational speed control signal detection circuit 22. The rotational speed of the motor 20 is controlled according to the phase difference thus obtained. Accordingly, the video disc 21 can be controlled to the specific rotational speed at which the video disc 21, is reproduced at a horizontal scanning frequency of the N system (or the P system) disc even when the disc 21 is of the p system (or N system).

In the above described embodiment of the prevent invention, the integer M is assumed to be the same value irrespective of whether the system is a P or N system. Further, the rotational speed control signal which is a reciprocal of an integer times the horizontal scanning frequency $f_{Hn}$ (or $f_{Hp}$) is used because the lower frequency is advantageous in view of factors such as mechanical response of the rotational servo.

Next, a modification of the first embodiment of the apparatus of the present invention will be described in conjunction with FIG. 2. In the present modification, the video disc recorded similarly as in the first embodiment, is reproduced in a manner such that the rotational speed control signal is periodically reproduced 5 or 25 times within one frame period. These numbers, that is, 5 and 25 are obtained by considering a common divisor so that the frequency division ratio is the reciprocal of an integer, since 525 scanning lines exist in the N system and 625 scanning lines exist in the P system. When detecting the rotational speed control signal 5 times within one frame period, a signal rotational speed control signal is recorded every 105 (=525/5) scanning lines in the N system and every 125 (=625/5) scanning lines in the P system. Similarly, in the case where the rotational speed control signal is detected 25 times within one frame period, a single rotational speed control signal is recorded every 21 scanning lines in the N system and every 25 scanning lines in the P system.

Hence, in the present modification, frequency dividers 24 and 25, and a changeover switch 26 are provided instead of the frequency divider 23, as indicated in FIG. 2. When reproducing the video disc having 5 (or 25) rotational speed control signals recorded periodically within one frame period, in the P system disc Dp, the frequency division ratio 1/Mp of the frequency divider 24 is set to 1/125 (or 1/25), and a signal derived therefrom is supplied by way of the switch 26 to the comparator 18, and in the N system disc Dn, the frequency division ratio 1/Mn of the frequency divider 25 is set to 1/105 (or 1/21), and a signal derived therefrom is supplied by way of the switch 16 to the comparator 18. Accordingly, the discs Dp and Dn can be reproduced interchangeably.

Figure 3:
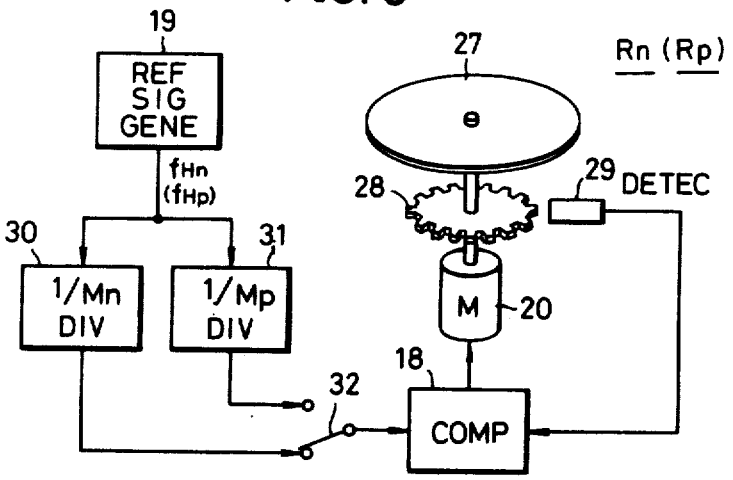
FIG. 3 is a systematic block diagram showing a second embodiment of a reproducing apparatus of the present invention.

FIG. 3 is a systematic block diagram showing a first embodiment of an apparatus according to the present invention. In FIG. 3, those parts which are the same as those corresponding parts in FIG. 2 are designated by like reference numerals, and their description is omitted.

The apparatus of the present embodiment is suitable for a constant angular velocity system (CAV system) disc.

The CAV system disc is different from the constant linear velocity system (CLV system) and is recovered with the synchronizing signals aligned towards the center of the disc. For example, in a CAV system disc having four fields of color video signals per rotation, the vertical synchronizing signals are recorded aligned toward the center of the disc at positions indicated by $33_1$–$33_4$ in FIG. 4. Accordingly, by controlling the rotational frequency of a rotary shaft of the motor for rotating the disc, it is possible to equivalently set the reproduced horizontal scanning frequency to a predetermined value.

In FIG. 3, a disc 27 and disc-shaped gear wheel 28 made of magnet which rotate unitarily together with the rotary shaft of the motor 20, are supported on a rotary shaft of the motor 20. A magnetic detector 29 is disposed to confront the gear wheel 28, and operates together with the same gear 28 to detect the rotational speed of the motor. The gear 28 is provided with tooth periodically at equal angular intervals. Every time when each teeth of the gear wheel 28 passes by the magnetic detector 29, the magnetic detector 29 produces a single pulse. As means for detecting the rotational speed of the motor 20, instead of the magnet gear wheel 28 and the magnetic detector 29, various known devices may be adopted in which, for example, a disc having many slits along the peripheral direction is fixed to the rotary shaft of the motor 20, and the rotational speed is detected in accordance with the frequency of the light which is allowed to pass through the slits intermittently.

Figure 4:
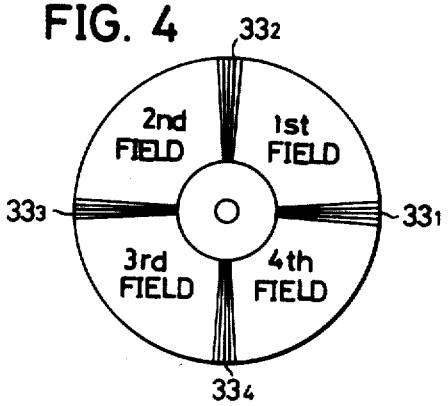
FIG. 4 is a diagram showing positional relationships between the recorded signals on the disc.

In the case where the disc 27 is recorded with four fields of color video signal per one complete turn as indicated in FIG. 4, the rotational speed of the motor 20 is set at 900 rpm for the disc Dn, and at 750 rpm for the disc Dn. The number of scanning lines recorded per one complete turn is 1050 for the disc Dp, and 1250 for the disc Dn. The common divisor of 1050 and 1250 are 2, 10, 25 and 50 (excluding 1). Accordingly, if the number of teeth of the gear wheel 28 is selected at one of the above listed five kinds of numbers, a relationship between the number of pulses generated from the magnetic detector 29 per one complete turn of the rotary shaft of the motor 20, and the number of scanning line per single pulse, and a relationship between the reproducing apparatus and the type of video disc to be reproduced, become as indicated in the following Table.

TABLE

| Reproducing Apparatus | Disc | Number of Output Pulses from Magnetic Detector 29 per one turn of the gear wheel | | | | | |
|---|---|---|---|---|---|---|---|
| | | 2 | 5 | 10 | 25 | 50 | |
| Pn | Dn | 525 | 210 | 105 | 42 | 21 | Number of |
| | Dp | 625 | 250 | 125 | 50 | 25 | scanning lines |
| Pp | Dn | 525 | 210 | 105 | 42 | 21 | per single |
| | Dp | 625 | 250 | 125 | 50 | 25 | output pulse |

As apparent from the above Table, the number of scanning lines per single output pulse of the magnetic detector 29, is determined by whether the disc is Dn or Dp, irrespective of the system of the reproducing apparatus. Accordingly, as indicated in FIG. 3, frequency dividers 30 and 31 are connected in parallel at the output side of the reference signal generator 19. The frequency division ratio 1/Mn of the frequency divider 30, is set at a value equal to a repetition frequency of the output pulse of the magnetic detector 29, when reproducing the N system disc Dn. When the number of teeth of the gear wheel 28 is 50, for example, the frequency division ratio of the frequency divider 30 is set at 1/21. Further, the frequency division ratio 1/Mp of the frequency divider 31 is set at a value equal to a repetition frequency of the output pulse of the magnetic detector 29 when reproducing the P system disc Dp. For example, when the number of the teeth of the gear wheel 28 is 50, the frequency division ratio is set at 1/25. The switch 32 is manually or automatically changed over so that the output of the frequency divider 30 is supplied to the comparator 18, when the disc Dn is to be reproduced and so that the output of the frequency divider 31 is supplied to the comparator 18, when the disc Dp is to be reproduced. Accordingly, the rotational speed of the motor 20 is thereby controlled so that the horizontal scanning frequency reproduced from the disc 27 coincides with a predetermined horizontal scanning frequency. As a result, the reproducing apparatus Rn (or Rp) can reproduce the disc Dp (or Dn).

When the number of teeth of the gear wheel 28 is large, this generally improves the rotational speed controlling capability, but is difficult to manufacture in actual practice. The number of gear teeth "50" indicated at the right most column in the above Table is preferable in view of both performance and machining operation, and is most suitable for the apparatus of the present invention.

If the disc is of the CAV system, and is recorded with two fields of color video signal per one track turn, the gear wheel 28 which has 5 or 25 gear teeth is used. In addition, the frequency division ratio of the frequency dividers 30 and 31, are respectively set at 1/105 and 1/125 for a 5-teeth gear wheel, and at 1/21 and 1/25 for a 25-teeth gear wheel.

In this embodiment of the invention, since the rotational speed of the disc is detected by detecting the rotational speed of the motor 20, it is advantageous in that the rotational speed of the disc can be rapidly controlled to the predetermined rotational speed without picking up and reproducing the disc 27 by means of the reproducing element. The embodiment of the invention may be modified, similar to the case of the modification of the first embodiment, in a manner such that two types of oscillators for generating their specific repetition frequencies replace the circuit comprising the reference signal generator 19, and the frequency dividers 30 and 31.

Next, a third embodiment of the apparatus of the present invention will be described. According to the present embodiment of the invention, in a disc recording and reproducing system wherein the luminance signal and the carrier chrominance signal are multiplexed and the signal thus multiplexed modulates carrier to be recorded on the disc and reproduce the signal thus recorded from the disc, in order to establish a relationship where the multiplexed luminance signal and the carrier chrominance signal undergo frequency interleaving with each other, a color sub-carrier frequency $f_c$ of the carrier chrominance signal is selected at a frequency which is an odd-number multiple of ½ the horizontal scanning frequency, and further, an odd-number multiple of ½ the horizontal scanning frequency assumes the same value for the P system disc Dp and the N system disc Dn. Specifically, the color sub-carrier frequency $f_{cp}$ of the carrier chrominance signal of the disc Dp is selected at $2n-1/2 \cdot f_{Hp}$, and the color sub-carrier frequency $f_{cn}$ of the carrier chrominance signal of the disc Dn is selected at $2n-1/2 \cdot f_{Hn}$, where $2n-1/2$ is 162.5, for example.

In such cases where the disc Dp thus recorded is reproduced by the reproducing apparatus Rp, and where the disc Dn is reproduced by the reproducing apparatus Rn, both the reproduced horizontal scanning frequency and the color sub-carrier frequency are different depending on the above cases. Therefore, the reproducing apparatuses Rs and Rn respectively have standard reproducing circuits different from each other. In a case where the reproducing apparatus Rn reproduces the disc Dp, the rotational speed of the disc is controlled so that the horizontal synchronizing signal which has been recorded is reproduced as not of the frequency $f_{Hp}$ but of the frequency $f_{Hn}$. Accordingly, the reproduced carrier chrominance signal has a color sub-carrier frequency of $2n-1/2 \cdot f_{Hn}$ and not of $2n-1/2 \cdot f_{Hp}$, and therefore is equivallent to the carrier chrominance signal of the N system disc which can be reproduced by means of the reproducing apparatus Rn. That is, the reproducing apparatus Rn reproduces the carrier chrominance signal at a frequency equal to the N system carrier chrominance signal, which means that it is not necessary to modify a chrominance processing circuit in the reproducing apparatus Rn. The result is also the same in the case wherein the reproducing apparatus Rp reproduces the disc Dn. That is, the reproducing apparatus Rp reproduces the carrier chrominance signal at a frequency equal to that of the carrier chrominance signal of the P system.

Figure 5:
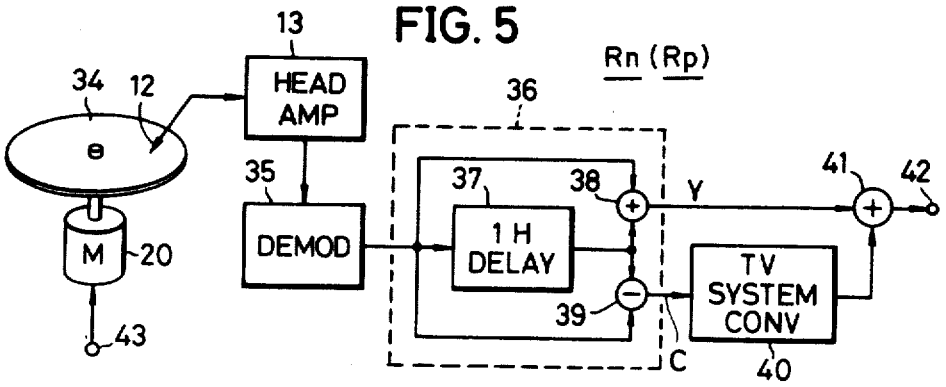
FIG. 5 is a systematic block diagram showing a third embodiment of a reproducing apparatus of the present invention.

FIG. 5 is a systematic block diagram showing a third embodiment of the apparatus of the invention described above. In FIG. 5, those parts which are the same as or equivalent to corresponding parts in FIG. 1 are designated by like reference numerals and will not be described again in detail.

Referring to FIG. 5, a disc 34 is recorded with a signal within the carrier chrominance signal having a color sub-carrier frequency of $2n-1/2 \cdot f_{Hp}$ (or $2n-1/2 \cdot f_{Hn}$) multiplexed with the luminance signal, and the carrier is subjected to, for example, frequency modulation with the signal thus multiplexed. This disc 34 is rotated by a motor 20 under the control of a signal for controlling the rotational speed, which is supplied thereto from a terminal 43. The FM demodulator 35 produces a demodulated signal, which is a multiplexed signal formed from the luminance signal and the carrier chrominance signal which are arranged so as to interleave with each other with respect to horizontal scanning frequency. Additionally, both the horizontal scanning frequency and the color sub-carrier frequency of the demodulated signal, are respectively equal to corresponding frequency of the television system which is to be originally reproduced by the same reproducing apparatus. Accordingly, in both cases where the discs Dn and Dp are reproduced, a 1H delay line 37 which constitutes a separation circuit, can be used in common. The 1H delay line is generally of high precision, and cannot be used in common for both the N system and the P system, even though the difference between the horizontal scanning frequencies of the N and P systems is only about 0.7%. In contrast, the present embodiment of the invention enables the 1H delay line to be used in common due to the reasons set forth above.

Signals introduced to and led out from the 1H delay line 37 are added at an adder 38 thereby to produce the luminance signal. On the other hand, signals introduced to and led out from the 1H delay line 37 are subtracted from each other at a subtractor 39 thereby to produce the carrier chrominance signal. This carrier chrominance signal, as described above, is not a signal modulated by a specific modulation system of the NTSC system, the PAL system, or the SECAM system, but is a signal wherein the color sub-carrier frequency is subjected to 9 carrier suppressing right-angle two-phase modulation, for example, by use of, two color difference signals. The carrier chrominance signal produced from the subtractor 39 is supplied to a television system converter 40, where it is converted to the carrier chrominance signal which conforms to a specific television system, and is then supplied to an adder 41, where it is multiplexed with the reproduced luminance signal from the adder 38 to produce a standard color video signal of the above specific television system. This color video signal is led out through an output terminal 42 and is fed to the television receiver for monitoring.

According to the present embodiment, three kinds of reproducing apparatus, are prepared in accordance with the chrominance signal transmission modes, that is, the NTSC system, the PAL system, and the SECAM system reproducing apparatuses, while two kinds of discs, that is, the N system disc and the P system disc exist. When the disc Dp is reproduced by the SECAM system reproducing apparatus, it produces the normal standard color video signal conforming to the SECAM system standards. In the case where this SECAM system reproducing apparatus reproduces the disc Dn, the reproduced horizontal scanning frequency is exactly the same as that of the SECAM system. Only the field frequency becomes 59.5 Hz which is higher by about 20% above the normal frequency 50 Hz, but the commercially available SECAM system color television receiver is generally capable of synchronizing with the above field frequency of 59.5 Hz. Further, the carrier chrominance signal reproduced, is exactly the same as that of the SECAM system. Accordingly, the SECAM system can receive the reproduced signal without accompanying any difficulties. Similar to the preceding case, the PAL system reproducing apparatus and the NTSC system reproducing apparatus are also capable of reproducing two kinds of discs interchangeably.

In the meanwhile, there exists a disc having a tracking control signal which is recorded on each track or between tracks adjacent each other, and the frequency range of which is outside that of the carrier of the video signal. This tracking control signal is reproduced by the reproducing element and causes the reproducing element to be controlled so as to follow and trace the track. For example, a disc has been proposed wherein first and second reference signals $f_{T1}$ and $f_{T2}$ for tracking control (hereinafter referred to as "tracking signals") having frequencies lower than the frequency range of the carrier of the video signal and are mutually different, are recorded, where the tracking signals are changed over every one complete rotation period of the disc. A sub-track is formed at an intermediate part between adjacent recorded tracks, in a burst form, and further, a third tracking signal $f_{T3}$ for changing over tracking polarities of the tracking servo circuit is recorded, with levels being less than a predetermined level so as not to have a deterimental effect on the video signal reproduction, on the video signal recorded track adjacent to position where disposition of $f_{T1}$ and $f_{T2}$ are changed over (these positions are selected at one position among four positions of the vertical blanking period of time when four-fields of the video signal is recorded per one complete rotation of the disc).

In the apparatus of the present invention, frequencies of the tracking signals $f_{T1}$, $f_{T2}$ and $f_{T3}$ are respectively selected at values which are real number multiples of the horizontal scanning line frequency $f_{Hp}$ or $f_{Hn}$. Here, the real number is not required to be an integer or an odd-multiple of $\frac{1}{2}$, because an appropriate band-pass filter may be used for separating the tracking signals $f_{T1}$, $f_{T2}$, and $f_{T3}$ from each other. However, since circuit arrangement of the disc reproducing apparatus may induce possible beat due to infiltration of the tracking control signal into the video signal, it is preferred to select the frequency of the tracking signals to a frequency which is an odd-number multiple of the frequency $f_H$ or $f_H/2$.

By selecting the frequency of the tracking control signals as set forth above, when either disc Dn or Dp is reproduced at horizontal scanning frequencies of the reproducing apparatus Rn and Rp, the tracking signals are also reproduced at frequencies based on the reproducing apparatus Rn and Rp. Accordingly, it is not necessary to change over the tracking signal discrimination circuit according to the types of the video disc to be reproduced.

Moreover, according to the apparatus of the present invention, the rotational speed of the disc is controlled so as to always reproduce the horizontal scanning frequencies $f_{Hn}$ or $f_{Hp}$ determined by the disc reproducing apparatus, irrespective of which of the discs Dn and Dp are to be reproduced. Therefore, when recording an information signal other than the video signal on the discs, the information signal is recorded at a frequency which is a real-number (being an arbitrary value but the same value in each case) multiple of the horizontal scanning frequency $f_{Hn}$ of $f_{Hp}$ for discs Dn and Dp. Accordingly, in either case where the discs Dn or Dp is reproduced by the same reproducing apparatus, a circuit for frequency selecting the above information signals can be used in common.

As an example of the above described information signal, there are signals other than the tracking signals. Firstly, there is a PCM signal in which the track number, program number, time and the like are subjected to pulse code modulation (PCM) and recorded within the vertical blanking period of the standard video signal for the purpose of displaying the track number being reproduced and cueing a desired program. Secondly, there is an audio signal accompanied by the standard video signal.

Here, by selecting the clock frequency of recording PCM signal to a value which is the same real-number multiple of the frequency of the horizontal synchronizing signal which is to be recorded on the video disc, the PCM signal is reproduced at the same clock frequency, irrespective of which of the discs Dp and Dn is reproduced, whereby the same PCM signal reproducing circuit can be used in common. When clock reproduction is taken into consideration, an integer multiple is preferred as compared to a real-number multiple. In the case where PCM is of a clock self-reproduction type, such as bi-phase, space, code modulation system, any arbitrary real-number multiple may be adopted without difficulty.

The audio signal is used as either monophonic, stereophonic, or bilingual sound. For this purpose, one or two sub-carriers are subjected to FM, AM, or PM modulation with the audio signal, and the signal thus modulated is multiplexed with the standard television system video signal (standard video signal), while another carrier is modulated with the signal thus multiplexed and is recorded on the disc. In this connection, the frequency of the sub-carrier for an audio carrier is selected at a value which is the same real-number multiple of the frequency $f_{Hn}$ or $f_{Hp}$ of the horizontal synchronizing signal which is to be recorded on the disc. An odd-number multiple of $f_{Hn}/2$ or $f_{Hp}/2$ is preferred when beat interference and the like are taken into consideration. Also, in this case, the discs Dn and Dp are reproduced at the same frequency, whereby a filter for discriminating the audio sub-carrier can be used in common. Additionally, it is possible to record the signal wherein the audio sub-carrier is multiplexed with the carrier modulated with the standard video signal. In this case, the audio sub-carrier may be selected to the same real-number multiple of the frequency $f_{Hn}$ or $f_{Hp}$.

Furthermore, when recording the carrier which is frequency modulated with the standard video signal on the video disc, a carrier frequency corresponding to the pedestal level of the video signal and/or another carrier frequency corresponding to the peak level of the synchronizing signal are selected to a value which is a real-number multiple of the horizontal scanning frequency $f_{Hn}$ or $f_{Hp}$ of the standard video signal, where the real-number is the same for both the discs Dn and Dp. Accordingly, similar to the above case, the disc reproducing apparatus Rn and Rp can respectively reproduce discs Dp and Dn of a different system at a frequency inherent to the disc reproducing apparatus under operation. If the horizontal scanning frequency of the video signal is not selected as set forth above, the pedestal level and the peak level of the synchronizing signal undergo change depending on the disc which is to be reproduced, which may cause trouble upon reproduction of a direct current component of the video signal. The pedestal level frequency and the synchronizing signal peak level frequency can be of a real-number multiple of the frequency $f_{Hn}$ or $f_{Hp}$, but it is preferable to set them to an odd-number multiple of the frequency $f_{Hn}/2$ or $f_{Hp}/2$, because the FM signal has a relatively higher energy level at the pedestal level and the synchronizing signal peak level.

The embodiments described above are all directed to the video disc. Next to be described is an embodiment which is adapted to reproduce a rotary recording medium recorded with pulse code modulated audio signal as variations in geographical shapes thereon. (hereinafter referred to as "audio disc"), in addition to the video disc.

As has been described above, the CAV system apparatus of the present invention should be arranged so that the motor rotates at rotational speeds within a predetermined range depending on the video disc Dn or Dp, which thereby ensures that the reproduced horizontal scanning frequency, coincides with the horizontal scanning frequency inherent to the reproducing apparatus under operation. In order to meet this requirement, the present embodiment is arranged so that, based on either the PCM clock frequency of the audio disc or a frequency of on oscillator for forming the clock signal, is formed into a signal having a frequency near the frequency $f_{Hn}$ or $f_{Hp}$. This signal is used instead of the output reference signal of the reference signal generator 19 indicated in FIG. 3. Accordingly, similar to the embodiment indicated in FIG. 3, the motor can be controlled so as to rotate at a predetermined rotational speed, as long as the rotational speed of the audio disc falls within the above described range, and the PCM signal thus reproduced is generated with a predetermined clock signal. Therefore, the disc reproducing apparatus can be modified into an audio disc reproducing apparatus only with the addition of a simple adapter.

By selecting the data rate or clock frequency of the PCM signal recorded on the audio disc at the frequency which is K/M (K and M are integers) times the frequency $f_{Hn}$ or $f_{Hp}$, or a frequency in the vicinity thereof. Further, by using the frequency $f_{Hn}$ or $f_{Hp}$, or a frequency in the vicinity thereof, it becomes possible to obtain the PCM reproducing signal having a predetermined data rate or clock frequency. Moreover, by using the above described adapter, the reproducing apparatuses Rn and Rp can respectively obtain the same rotational speed.

The adapter may be either be separated from the reproducing apparatus or incorporated inside the reproducing apparatus.

Figure 6:
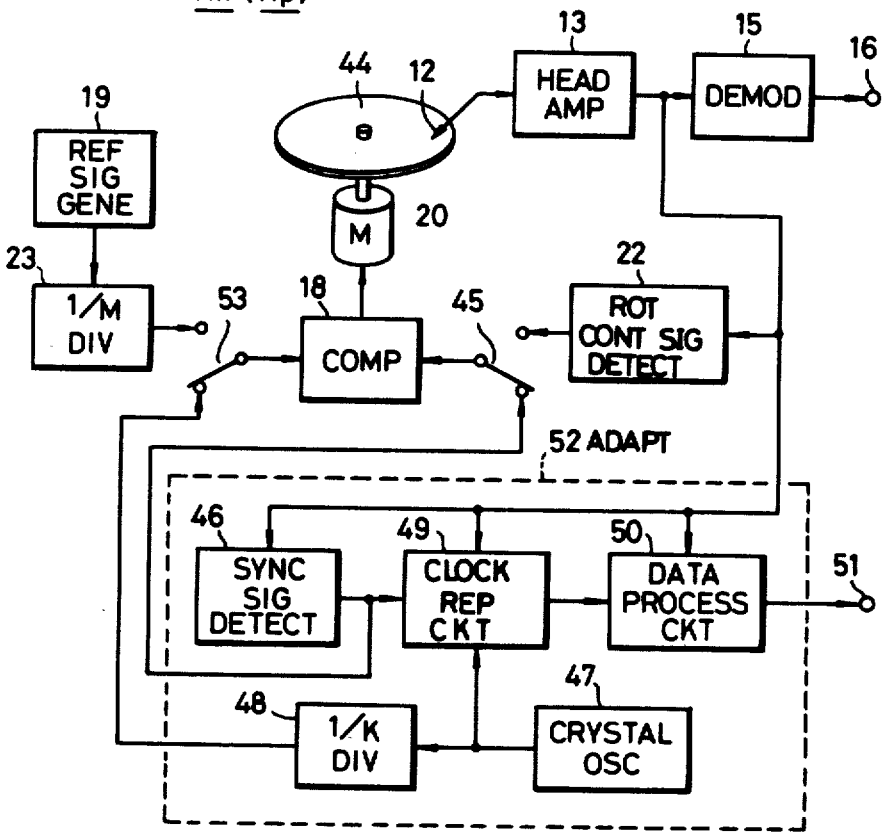
FIG. 6 is a systematic block diagram showing a fourth embodiment of a reproducing apparatus of the present invention.

FIG. 6 is a systematic block diagram showing a fourth embodiment of the apparatus which can operate also as audio disc reproducing device. In FIG. 6, those parts which are the same as corresponding parts in FIG. 2 are designated by like reference numerals and will not be described again in detail. A reference numeral 44 disgnates either an audio disc or a video disc recorded with the rotating speed controlling signal. When the audio disc is to be reproduced, change-over switches 45 and 53 are respectively connected to an adapter 52. The audio disc has been recorded with a time divided and multiplexed signal comprising the PCM signal and a synchronizing signal which has been subjected to PCM for every period of $f_{Hp}$ or $f_{Hn}$, or a multiple of the reciprocal of an integer of $f_{Hp}$ or $f_{Hn}$ (the overall data rate of the PCM signal being an integral multiple of the reciprocal of an integer of $f_{Hn}$ or $f_{Hp}$). The reproduced signal of the audio disc is supplied to a synchronizing signal detector 46, a clock reproduction circuit 49 and a data-processing circuit 50 within the adapter 52.

The synchronizing signal detector 46 detects the above described PCM synchronizing signal. The signal thus detected is supplied by way of the change over switch 45 to the comparator 18, where it is compared with a signal, which is obtained by causing an output signal of an original oscillator 47 to pass through a frequency divider 48 with frequency division ratio of 1/K, and thereby has a frequency equal to that of the synchronizing signal. Respective to a signal from the comparator 18, the motor 20 is controlled so that the PCM signal having the predetermined clock frequency is reproduced from the audio disc.

The PCM signal thus reproduced is demodulated in a known method by means of the clock reproduction circuit 49 supplied with both the output of the synchronizing signal detector 46 and the output of the original oscillator 47, and the data processing circuit 50, and normal audio signal is thereby led out through an output terminal 51.

Further, this invention is not limited to these embodiments but various variations and modifications may be made without departing from the scope of the invention.

What is claimed is:

1. A rotary recorded medium which has a video signal pre-recorded thereon in any of at least two formats, both of said formats being reproducible on a reproducing system designed around any of said formats, a first of said formats being a medium pre-recorded at a first rotational speed with a first video signal which is compatible with a television receiver of a first television broadcasting standard, said first format having a first horizontal scanning frequency $f_{H1}$ and a first frame frequency, a second of said formats being a medium pre-recorded at a second rotational speed with a second video signal which is compatible with a television receiver of a second television broadcasting standard, said second format having a second horizontal scanning frequency $f_{H2}$ and a second frame frequency, a first system reproducing apparatus primarily designed for use with the television receiver of said first television broadcasting standard comprising first means for rotating said first format recorded medium at said first rotational speed for reproducing the first video signal having said first horizontal scanning frequency $f_{H1}$ for the television receiver of said first television broadcasting standard, the first rotating means in said first system reproducing apparatus rotating said second format recorded medium to reproduce said second video signal at a scanning frequency equal to said first horizontal scanning frequency $f_{H1}$ for the television receiver of said first television broadcasting standard, a second system reproducing apparatus primarily designed for use with the television receiver of said second television broadcasting standard comprising second means for rotating said second format recorded medium at the second rotational speed for reproducing the second video signal having said second horizontal scanning frequency $f_{H2}$ for the television receiver of said second television broadcasting standard, the second rotating means in said second system reproducing apparatus rotating said first format recorded medium to reproduce said first video signal at a scanning frequency equal to said second horizontal scanning frequency $f_{H2}$ for the television receiver of said second television broadcasting standard, said first format recorded medium having a first carrier chrominance signal pre-recorded thereon, said first carrier chrominance signal having a first chrominance subcarrier frequency $f_{c1}$ equal to $kf_{H1}$, where k is a real number, and said second format recorded medium having a second carrier chrominance signal pre-recorded thereon, said second carrier chrominance signal having a second chrominance subcarrier frequency $f_{c2}$ equal to $kf_{H2}$ so that both the first and second format recorded mediums are playable on both said first and second system reproducing apparatuses.

2. The rotary recorded medium as claimed in claim 1, in which said real number k is equal to $(2n-1)/2$, where n is a positive integer.

3. The rotary recorded medium as claimed in claim 1, in which said first format recorded medium has a first signal which is pre-recorded at a first rotational speed, said first pre-recorded signal including a control signal having a frequency which is equal to either the first horizontal scanning frequency $f_{H1}$ or a reciprocal of an integer times the horizontal scanning frequency $f_{H1}$, and said second format recorded medium has a second signal which is pre-recorded at a second rotational speed, said second pre-recorded signal including a control signal having a frequency which is equal to either the second horizontal scanning frequency $f_{H2}$ or a reciprocal of an integer times the horizontal scanning frequency $f_{H2}$.

4. The rotary recorded medium as claimed in claim 1, on which a rotational speed control signal is pre-recorded in a burst manner, the bursts of control signals being a number per frame period of the video signal which is equal to a common divisor of horizontal scanning line numbers of said first and second television broadcasting standards.

5. The rotary medium as claimed in claim 1, on which the video signal is pre-recorded in a form of a frequency modulated carrier, an instantaneous frequency of the carrier corresponding to the pedestal level of the video signal or corresponding to the peak level of a horizontal synchronizing signal of the video signal being m times each of the first and second horizontal scanning frequencies, where m is a real number.

6. A reproducing apparatus primarily designed for playing a first format recorded medium which is pre-recorded at a first rotational speed, the first format comprising a first video signal having a first horizontal scanning frequency $f_{H1}$ resulting in m frames of the first video signal, each frame in said first format having a first number of scanning lines and being pre-recorded on one track turn of said first format recorded medium, where m is an integer, said first format recorded medim rotating at the first regular rotational speed so that said first horizontal scanning frequency $f_{H1}$ is reproduced unchanged, said apparatus also playing a second format recorded medium in place of the first format recorded medium which second format recorded medium is pre-recorded at a second rotational speed, the second format comprising a second video signal having a second horizontal scanning frequency $f_{H2}$ resulting in [m] *n* frames of the second video signal, each frame in said second format having a second number of scanning lines and being pre-recorded on one track turn of said second format recorded medium, *where n is an integer,* said second format recorded medium rotating to reproduce said second video signal at a horizontal scanning frequency equal to said first horizontal scanning frequency $f_{H1}$, said reproducing apparatus comprising: means for generating a number of rotation detection pulses for every one revolution of said rotary recorded medium, said number being equal to a divisor which is common to said first and second numbers of horizontal scanning lines; means for generating a reference signal having a frequency which is obtained by dividing the first horizontal scanning frequency $f_{H1}$ by the first number of horizontal scanning lines on one track *turn* of said first system recorded medium and then multiplying said common divisor with the quotient; and means for comparing the frequency of the generated reference signal and the frequency of the rotation detection pulses and for controlling the rotational speed of said rotary recorded medium so that the two frequencies being compared become equal to each other.

7. The reproducing apparatus as claimed in claim 6, in which said recorded medium has a rotational speed control signal pre-recorded thereon, said rotational speed control signal being reproduced, and said means for generating a number of rotation [detetion] *detection* pulses responding to said reproduced rotational speed control signal, to generate said rotation detection pulses.

8. The reproducing apparatus as claimed in claim 6, in which said recorded medium has said video signal pre-recorded in a constant angular velocity system, and said means for generating a number of rotation detection pulses is a rotational speed detecting pulse generating means for obtaining a rotational speed detecting pulse in response to the rotational speed of said rotary recorded medium.

* * * * *